United States Patent [19]
Exsted et al.

[11] Patent Number: 6,010,776
[45] Date of Patent: Jan. 4, 2000

[54] MICROPOROUS MATERIALS CONTAINING CROSS-LINKED OIL

[75] Inventors: Bert J. Exsted, St. Paul, Minn.; Robert J. Maki; Jeffrey M. Mailand, both of Hudson, Wis.; Scott R. Kaytor, Minneapolis, Minn.; Claudia L. Allison, Fargo, N. Dak.; Sean B. Mahoney, Lexington, Ky.

[73] Assignee: 3M Innovative Properties Company, St. Paul, Minn.

[21] Appl. No.: 09/081,239

[22] Filed: May 19, 1998

[51] Int. Cl.[7] ................................................. B32B 3/26
[52] U.S. Cl. ..................... 428/305.5; 428/315.5; 428/315.9; 521/61
[58] Field of Search ........................................... 428/305.5

[56] References Cited

U.S. PATENT DOCUMENTS

| | | | |
|---|---|---|---|
| 4,247,498 | 1/1981 | Castro | 264/41 |
| 4,539,256 | 9/1985 | Shipman | 428/315.5 |
| 4,726,989 | 2/1988 | Mrozinski | 428/315.5 |
| 4,791,144 | 12/1988 | Nagou et al. | 521/90 |
| 4,849,311 | 7/1989 | Itoh et al. | 429/192 |
| 4,867,881 | 9/1989 | Kinzer | 210/490 |
| 4,868,222 | 9/1989 | Chau et al. | 521/61 |
| 4,873,037 | 10/1989 | Chau et al. | 264/49 |
| 5,057,262 | 10/1991 | Nohr et al. | 264/211 |
| 5,376,445 | 12/1994 | Fortuin | 428/339 |
| 5,476,665 | 12/1995 | Dennison | 424/484 |
| 5,624,627 | 4/1997 | Yagi et al. | 264/447 |

FOREIGN PATENT DOCUMENTS 0 765 900 A1   4/1997   European Pat. Off. .

OTHER PUBLICATIONS

D.R. Lloyd et al., "Microporous Membrane Formation Via Thermally–Induced Phase Separation", AIChE Symposium Series, 1988, vol. 84, No. 261, pp. 28–33.

*Primary Examiner*—Ellen M. McAvoy
*Attorney, Agent, or Firm*—Douglas B. Little

[57] ABSTRACT

Microporous materials formed by thermally induced phase transition from a crosslinkable oil in combination with a thermoplastic polymer providing covalent bonding and immobilization of the oil diluent. Such materials are useful in graphic imaging substrates and fluid-repellent diapers and garments.

21 Claims, No Drawings

MICROPOROUS MATERIALS CONTAINING CROSS-LINKED OIL

FIELD OF THE INVENTION

The present invention relates to microporous materials (e.g., films or mbranes) formed from a crosslinkable oil that is phase separated from a ermoplastic polymer in the film.

BACKGROUND OF THE INVENTION

Microporous films, sheets or membranes have a structure that enables fluids o flow through them. The effective pore size is at least several times the mean free ath of the flowing molecules, namely, from several micrometers down to about 100 Angstroms. Such sheets are generally opaque, even when made from an originally transparent material, because the surfaces and internal structure scatter visible light.

Microporous membranes or films have been utilized in a wide variety of applications, such as: the filtration of solids, the ultrafiltration of colloidal matter, diffusion barriers or separators in electrochemical cells, in the preparation of synthetic leather, and in the preparation of fabric laminates. The latter utilities require the membranes to be permeable to water vapor but not liquid water when preparing such articles as shoes, raincoats, outer wear, camping equipment such as tents, and the like. Moreover, microporous membranes or films are utilized for filtration of antibiotics, beer, oils, bacteriological broths, as well as for the analysis of air, microbiological samples, intravenous fluids, vaccines, and the like. Microporous membranes or films are also utilized in the preparation of surgical dressings, bandages, and in other fluid transmissive medical applications.

Microporous membranes or films may be laminated to other articles to make laminates having particular utility. Such laminates may include a microporous layer and an outer shell layer to provide a particularly useful garment material. Further, the microporous films or membranes may be utilized as a tape backing to provide such products as vapor transmissive wound dressings or hair setting tapes.

The art is replete with various methods of producing microporous materials. One useful technology found is thermally induced phase transition (TIPT). The TIPT process is based on the use of a polymer that is soluble in a diluent at an elevated temperature and insoluble in the diluent at a relatively lower temperature. The "phase transition" can involve a solid-liquid phase separation, a liquid-liquid phase separation or a liquid to gel phase transition. This technology has been employed in the preparation of microporous materials wherein thermoplastic polymer and a diluent are separated by a liquid-liquid phase separation as described in U.S. Pat. Nos. 4,247,498 and 4,867,881. A solid-liquid phase separation has been described in U.S. Pat. No. 4,539,256 wherein the thermoplastic polymer on cooling crystallizes out. The use of nucleating agents incorporated in the microporous material is also described as an improvement in the solid-liquid phase separation method, U.S. Pat. No. 4,726,989.

DISCLOSURE OF INVENTION

The present invention provides new microporous materials prepared by the TIPT process wherein the diluent contains a crosslinkable oil. This new technology provides an economical method for making microporous film from which oil will not leach out. The crosslinkable oil is crosslinked within the porous matrix of the TIPT polymer providing covalent bonding and thereby immobilizing the oil diluent. The microporosity is achieved by washing out a part of the oil that had not been crosslinked, by stretching the film, or by a combination of both techniques. These types of materials are less likely to foul subsequent coatings such as adhesives, and, when the porosity is achieved by only stretching, are generally less expensive than microporous films from which most or all of the diluent has been washed out. Absence of fouling is important in graphic imaging substrates and/or fluid-repellent diapers and garments wherein a coating or an adhesive is applied to the microporous film and (in the case of a pressure sensitive adhesive) is expected to re-adhere after detachment without substantial loss of adhesion.

Accordingly, the present invention in its first aspect is a microporous material containing a polymer component and at least 3% by weight of a crosslinked oil component. More specifically, the present invention is a microporous material including:

(a) about 10 (preferably 20) to 97 parts by weight of a polymer component, and (b) about 3 to 90 (preferably 80) parts by weight of an oil component, including at least one crosslinked oil, the oil component being miscible, prior to crosslinling, with the polymer component at a temperature above the melting point of the polymer component, liquid-liquid phase separation temperature of the total solution or gel formation temperature of the total solution. Parts by weight are based on the total of polymer and oil being 100 parts by weight.

A second aspect of the present invention is a method of making a imicroporous article including the steps of:

(a) melt-blending to form a solution comprising about 20 to 80 parts by weight of a polymer component, and about 20 to 80 parts by weight, based on total melt or solution content, of an oil component, including at least one crosslinkable oil, that is miscible with the polymer component at a temperature above the melting temperature of the polymer component or above the liquid-liquid phase separation temperature of the total solution, (b) forming a shaped article of the melt-blended solution, (c) cooling said shaped article to a temperature at which phase transition occurs between said oil and said polymer component through either (i) crystallization precipitation of the polymer component to form a network of polymer domains, or (ii) liquid-liquid phase separation to form cells of a polymer-lean phase, (d) creating porosity by stretching said article at least in one direction to separate adjacent crystallized polymer domains or polymer lean cells from one another to provide a network of interconnected micropores, and (e) crosslinking the crosslinkable oil.

A third aspect of the present invention is a microporous material including:

(a) about 2 (preferably 20) to 97 parts by weight of a polymer component;

(b) about 3 to 98 (preferably 80) parts by weight of an oil component, having at least one crosslinked oil, said oil component being miscible before crosslinking with the polymer component at a temperature above the melting point of the polymer component, liquid-liquid phase separation temperature of the total solution or the gel formation temperature of the total solution; and (c) about 0.001 to 2.0% of a crosslinking accelerator based on the weight of the total crosslinkable oil.

A fourth aspect of the present invention is a method of making a microporous article including the steps of:

(a) melt-blending to form a solution comprising about 2 (preferably 20) to 80 parts by weight of a polymer component, about 20 to 98 (preferably 80) parts by weight of an oil component, having at least one crosslinkable oil, said oil component being miscible with the polymer component at a temperature above the melting temperature of the polymer component, the liquid-liquid phase separation temperature of the total solution or the gel formation temperature of the entire solution;

(b) forming a shaped article of the melt-blended solution;

(c) cooling said shaped article to a temperature at which phase separation occurs between the oil component and the polymer component through either (i) crystallization precipitation of the polymer component to form a network of polymer domains, (ii) liquid-liquid phase separation to form cells of a polymer-lean phase or (iii) gelation;

(d) crosslinking the crosslinkable oil component to at least about 3% (preferably 25%) by weight based on total weight of the oil component but not more than about 75%; and (e) creating porosity by (i) removing uncrosslinked oil, (ii) removing uncrosslinked oil while restraining said article at least in one direction or (iii) removing uncrosslinked oil and orienting said article at least in one direction.

A fifth aspect of the present invention is a multi-layer microporous film containing at least one layer of a microporous material as described above.

DETAILED DESCRIPTION

The microporous material of the present invention includes a polymer component and at least 3% by weight of a crosslinked oil.

As used herein, the term "polymer component" refers only to conventional polymers which are melt-processible under ordinary melt-processing conditions or can be made melt-processable by plasticizer addition.

As used herein, the term "crystalline" with regard to polymer components includes polymers which are at least partially crystalline, preferably having a crystallinity of greater than 20 weight % as measured by Differential Scanning Calorimetry (DSC). Crystalline polymer structures in melt-processed polymers are known to those skilled in the art.

As used herein, the term "high density polyethylene" refers to a polyethylene within the class known in the art as high density polyethylene (HDPE) having a crystallinity of 80–90% and a density of 0.94–0.96 g/cm$^3$.

As used herein, the term "melting temperature" refers to the temperature at or above which a polymer component alone or in a blend with an oil will melt.

As used herein, the term "crystallization temperature" refers to the temperature at or below which a polymer component alone or in a blend with an oil, will crystallize.

As used herein, the term "liquid-liquid phase separation temperature" refers to the temperature at or below which a solution of a compatible polymer and diluent mixture, i.e., a homogeneous polymer diluent solution, phase separates by non-equilibrium phase separation (which has been described in the literature as binodal or spinodal decomposition).

As used herein, a "gel" is a highly viscous mixture comprised of a high molecular weight polymer and a liquid diluent at a concentration (e.g. 1–50 or more specifically 2–20 weight percent polymer) sufficient to form a three-dimensional polymer network in the presence of the diluent phase. It is thought that polymer network is formed by chemical or physical cross-linking. The gelation process is eversible (i.e. with increasing temperature, a gel can revert to a liquid solution). The tendency to form a gel is a function of polymer molecular weight. Ultra high molecular weight polyethylene mixed with a diluent is known to form a gel upon cooling.

As used herein, the term "gel transition temperature" refers to the point at or below which a sudden large increase in viscosity occurs.

As used herein, the term "oil component" refers to the diluent component in TIPT and comprises at least 50 wt percent crosslinkable diluent and up to 50 wt percent uncrosslinkable diluent.

As used herein, the term "compatible mixture" refers to a fine dispersion of one component (less than 1 micrometer particle size) in a continuous matrix of a second component or a fine inter-penetrating network of both components, and "compatible" refers to two or more polymers capable of forming such dispersions or interpenetrating networks with each other. Compatibility requires that at least one component of a compatible mixture be at least partially miscible with the other components.

As used herein, the term "oil-in" refers to a microporous film made by TIPT in which the oil component is not removed.

As used herein, the term "oil-out" refers to a microporous film made by TIPT in which the oil component is essentially removed.

Polymers useful in the present invention include olefinic, condensation and oxidation polymers. For example, polymers and/or copolymers may include ethylene vinyl alcohol polymers, polymethylpentene, polyesters, polyamides, polyethers, polyvinylidene fluoride, and the like. Preferred polymers are olefinic such as, for example, polyethylenes like linear low density polyethylene, low density polyethylene, high density polyethylene and ultra high molecular weight polyethylene; polypropylene; and polybutylene. These are described, for example, in U.S. Pat. Nos. 4,247,498, 4,539,256, 4,726,989, 4,867,881, and 4,849,311, which are incorporated herein by reference. Particularly useful are polypropylene and high density polyethylene. Mixtures of polymers may also be used as long as they are miscible with the diluent upon heating and form compatible mixtures upon cooling.

Miscibility and compatibility of polymers are determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference by the factor (V/RT), where V is the molar volume of the amorphous phase of the repeated unit V=M/$\rho$ (molecular weight/density), R is the gas constant, and T is the absolute temperature. As a result, Flory-Huggins interaction parameter between two non-polar polymers is always a positive number. Thermodynamic considerations require that for complete miscibility of two polymers in the melt, the Flory-Huggins interaction parameter has to be very small (e.g. less than 0.002 to produce a miscible blend starting from 100,000 weight-average molecular weight components at room temperature). It is difficult to find polymer blends with sufficiently low interaction parameters to meet the thermodynamic condition of miscibility over the entire range of compositions. However, industrial experiences suggest that some blends with sufficiently low Flory-Huggins interaction parameters, although still not miscible based on thermodynamic considerations, form compatible blends.

Unlike miscibility, compatibility is difficult to define in terms of exact thermodynamic parameters, since kinetic factors, such as melt processing conditions, degree of mixing, and diffusion rates can also determine the degree of compatibility.

Some examples of compatible polyolefin blends are: low density polyethylene and ethylene propylene diene terpolymer; low density polyethylene and ethylene vinyl acetate copolymer; polypropylene and ethylene propylene rubber; polypropylene and ethylene alpha-olefin copolymers; polypropylene and polybutylene.

In the presence of a common diluent or oil component that is miscible with all polymers in a blend above their melting temperatures, the thermodynamic requirements for miscibility relax. Two polymers with Flory-Huggins interaction parameter that is significantly greater than the critical value for miscibility in a binary system, can still be miscible in a melt comprising a ternary system with a common solvent, at least over a range of compositions.

Compatibility affects the range of useful polymer concentrations. If the polymers are incompatible, that range of compositions can be quite narrow, restricted to very low polymer concentrations, and of minimal practical usefulness in making the articles of this invention. However, if polymers are compatible, a common solvent can promote their miscibility into the composition regions of much higher polymer concentrations, thus allowing the use of common processing techniques such as extrusion to make articles of this invention. Under these conditions, all components in the melt are miscible and phase-separate by crystallization precipitation or liquid-liquid mechanism upon cooling below the phase separation temperature. The rate of cooling is quite rapid (preferably sufficient so that the melt-blended solution cools below the phase boundary in 30 seconds or less) and controlled by the process conditions that minimize the size of phase-separated microdomains and provides uniformity on a microscopic level.

Compatibility also affects the film uniformity. Cast films that are made from compatible blends by the method of this invention are transparent which confirms the uniformity on a microscopic level. This uniformity is of great importance for successful post-processing: films with a lesser degree of uniformity made from incompatible polymers break easily during stretching when stretching is used to create porosity. Film uniformity is also important in some applications, such as thermal shutdown battery separators, for which reliable shutdown performance on a microscopic level is desirable to prevent local overheating when a short circuit develops across the separator.

The microporous material or at least one porous layer in a multi-layer system may be prepared by melt-blending a polymer component, i.e. polymer or polymer mixture above described, to form a solution by heating the mixture with an oil component that contains a crosslinkable oil at a temperature above the melting temperature of the polymer or above the liquid-liquid phase separation temperature, depending on the phase separation mechanism employed.

Crosslinkable oils of the present invention form part or all of the oil component of the present invention. Such crosslinkable oils are those that are capable of forming a solution with a polymer component (polymer or polymer mixture) at an elevated temperature, and also capable of permitting the polymer component or components to phase separate when cooled. These crosslinkable oils can be synthetic or natural drying oils of the unsaturated oil family. The natural drying oils are those extracted from seeds or trees and are, for example, linseed oil, soybean oil, tall oil, tung oil, oitica oil, corn oil, safflower oil, sunflower oil, grapeseed oil, hemp oil, perilla oil, poppyseed oil, rubberseed oil and walnut oil. Synthetic drying oils include modified drying oils which can comprise natural drying oils and/or their fatty acids (for example, oleic, linoleic, and linolenic acids) with synthetic resins such as polyesters which can be modified with polybasic acids, e.g., phthalic acid, which in turn are referred to as oxidizing alkyds.

Tung oil (conjugated) dries more readily than linseed oil (non-conjugated triene), which dries more readily than soya oil (non-conjugated diene). Preferred crosslinkable oils are the natural oils such as, for example, linseed oil, sunflower oil, and safflower oil. The most preferred crosslinkable oil is linseed oil.

The oil component of the present invention may further comprise up to 50 wt % oils which cannot be crosslinked, based on total oil content. The useful uncrosslinkable oils are those that also form solutions with the polymer component at elevated temperatures and phase separate upon cooling. Uncrosslinkable oils include various types of organic compounds including paraffinic (alkane) and aromatic acids, alkanes, aromatic and cyclic alcohols, aldehydes, primary and secondary amines, aromatic and ethoxylated amines, diamines, amides, esters and diesters, ethers, ketones and various hydrocarbons and heterocylics. Particularly useful uncrosslinkable oils are, for example, phthalates, such as dioctyl-, diethyl- and dibutyl-; mineral oil; mineral spirits; triethyleneglycol; methylnonylketone; decanoic and oleic acids, and decylalcohol.

The microporous material in the present invention may further contain an accelerator that crosslinks or aids polymerization. Crosslinling accelerators are used to enhance the crosslinking process which occurs oxidatively as further described below. The amount of accelerator, when used, is typically from about 0.001 to about 2% of the weight of the total crosslinkable oil, depending on the crosslinking accelerator that is used. Such crosslinking accelerators are, for example, metal driers such as, for example, cobalt, manganese, cerium, vanadium, or iron. Polymerizable driers are, for example, lead, zirconium, rare earth metals, aluminum or bismuth. Auxiliary modifiers may also be employed such as, for example, calcium, potassium, lithium or zinc. The preferred crosslinking accelerators are the metal driers; cobalt is especially preferred.

The above metals may be typically found in compounds or complexed with carboxylic acids of the following four commercially available types: fatty acids, naphthenic acids, octanoic acids and neodecanoic acids. In addition, a second accelerator as, for example, dipuridyl (Dry RX) or a diaromatic amine can be added to complex with the metal drier and enhance cure times.

Other crosslinking accelerators used to provide enhancement of crosslinking are, for example, free radical initiators, e.g. azobisisobutyronitrile (AIBN), organic peroxides and the like. Photoinitiators such as, for example, benzyl dimethylketal which is a free radical photoinitiator or an ionic photoinitiator such as triaryl sulfonium hexafluoroantimonate may be used when ultraviolet (UV) irradiation is used to enhance the crosslinking of the crosslirkable oil. Heat, gamma irradiation and electron beam irradiation may also be used to accelerate the crosslinking of the crosslinkable oil.

Stretching of the microporous materials that contain a crosslinking accelerator, catalyst or initiator is preferably done a short time (less than an hour) after making the melt-blend composition. Otherwise, the oil may crosslink, rendering the material nonporous even after stretching. Stretching, as a percent elongation, may be in the range of 50%–600% in the down-web and cross-web directions.

Microporous films containing crosslinkable or crosslirked oil, particularly linseed oil, tend to have a yellowish tint and a mildly obnoxious odor. Thus, colorants and/or odorants may be used to alter these features. A particularly useful colorant for obtaining white microporous films is $TiO_2$. Particularly useful odorants for obtaining a microporous film with a more pleasing odor are peppermint oil, lemon oil, orange oil and spearmint oil. The amount of additive is limited to a quantity that does not interfere with the formation of the microporous material of the invention.

The microporous material may also contain, in addition to the additives above described, conventional fillers or other additive materials in limited quantity so as also not to interfere with the formation of the microporous material of the present invention, and so as not to result in unwanted exuding of the additive. Such additives may include antistatic materials, plasticizers, fluorochemicals, UV absorbers, nucleating agents, hygroscopic metal salts alkoxides and the like. The amount of total additive content is typically less than 10% of the weight of the polymeric mixture, preferably less than 6% by weight, and more preferably less than 2% by weight.

The melt solution is prepared by mixing the polymer component and the oil component, under agitation such as that provided by an extruder and heating until the temperature of the mixture is above the (1) melting point of the polymer component (2) liquid-liquid phase separation temperature of the mixture, or (3) gel transition temperature of the mixture. At this point the mixture becomes a melt solution or single phase. When the polymer component is normally melt-processable, the weight ratio of polymer component to oil component in the melt solution may range from 20:80 to 80:20. When the polymer component needs to be plasticized to be melt-processable, and the plasticizer is the oil component, the ratio may range up to 1:98.

Once the melt solution is prepared, a shaped article is then formed by known methods, for example, employing an extruder. Preferably the composition fed to an extruder is relatively free of organic solvents that may interfere with extrusion. Too much solvent can cause the extrudate to be of poor quality or break up.

Cooling of the shaped article occurs either in the extruder, at or near the die at the extruder discharge, or preferably by casting the shaped material onto a casting wheel. Cooling causes the phase transition to occur between the oil and the polymer components. This may occur either by crystallization precipitation of the polymer component to form a network of polymer domains, by a liquid-liquid phase separation to form cells of a polymer-lean phase or by gelation.

The shaped material (e.g. the oil-in cast film) is nonporous at this stage and is rendered microporous by either stretching, washing or a combination thereof. The stretching is at least in one direction to separate adjacent crystallized polymer domains or polymer-lean cells from one another to provide a network of interconnected micropores. Stretching is carried out by pulling the films with either a length orienter and/or tenter (i.e. orienting down-web, cross-web or both) and is done either before or after the oil is crosslinked. When the film is pulled in more than one direction, the degree of stretch may be the same or different in each direction. Preferably, the film is stretched prior to significant crosslinking of the crosslinkable oil. Stretching must be accompanied with partial washing (e.g. reducing the oil component to ≦90% by weight of the total) with a solvent to achieve porosity in shaped gels.

The crosslinkable oils used as diluents during TIPT processing are capable of crosslinking with air by reacting their allylic hydrogen (R—H adjacent to a carbon—carbon double bond) with oxygen. The oxidative drying reaction typically yields allyl (R·), hydroperoxide (ROO·), and hydroxyl (HO·) free radicals which can further react with alkyl (R—H) groups and terminateldimerize in the form of an intermolecular covalent bond (e.g., alkyl (R—R), ether (ROR), and/or peroxide (ROOR)), either with the oil itself and/or the thermoplastic polymer resin. In the same system, intramolecular end-capping may occur (e.g., carbonyls (R=O), hydroxyls (ROH), and/or hydroperoxide (ROOH) groups may be formed, which do not link the molecules together but alter the surface chemistry of the system rendering it more hydrophilic).

In the absence of oxygen, free radicals or ions can be created by initiators or irradiation sources (e.g. electron beam). These reactive species typically favor both intermolecular and intramolecular (R—R) alkyl bonding.

Oxidative crosslining is accelerated by the presence of metal catalysts or by exposure to heat or radiant energy. Generally, the activation energy for oxygen absorption from a drying oil is approximately 10 kcal/mol. In the presence of a metal drier/catalyst (e.g., a cobalt salt), this energy is often reduced by a factor of ten or about 1 kcal/mol. In this case the metal undergoes a series of redox reactions, fluctuating between Co(II) and Co(III) and forming hydroxyl anions (HO—) and hydrogen cations ($H^+$) in addition to the intermediates and crosslinking products listed above. Light also tends to reduce the drying time as it converts triplet oxygen to singlet oxygen and only the singlet oxygen reacts with the unsaturated drying oils. Extent of crosslinking affects the surface properties of microporous films of the invention. Crosslinking of the crosslinkable oil may also be initiated by radiant energy sources that generate free radicals, e.g., UV, electron beam (e-beam), and/or gamma irradiation. As long as free radical electrons are generated, oxidative crosslinking can be achieved.

In most microporous TIPT film processes, absence of an oxidation catalyst such as Co(II), Mn(II), Ce(III), V(III) and Fe(II) will result in an oil-in TIPT film wherein the oil is still mobile after the cooling step. However, with the passage of time (eg. one day to one week) crosslinking can occur making the crosslinkable oil increasingly immobile. A small degree of oxidative absorption and crosslinking (e.g., 3%) can alter the film's surface properties, making it more hydrophilic and in some cases, more agreeable to lamination via secondary bonding (e.g., hydrogen bonding) due to the higher surface energy. Larger extent of crosslinking, e.g., greater than 50% provides microporous films which are less likely to foul an adhesive since the crosslinked oil diluent is immobilized.

In addition, auxiliary catalysts or modifiers such as Ca(II), K(I), Li(I), and Zn(II) metal driers can be used in combination with or without those listed above. Polymerizing driers may also be used and are actually consumed in the crosslinking reaction, becoming permanent metal oxide bridges within the crosslinked oil. Driers such as Pb(II), Zr(IV), rare earth RE(III), Al(III), and Bi(III) tend to cure the inner bulk of the oils and are referred to as Through-Dry agents. While any one of these metal driers or a combination thereof can be used to cure or crosslink the drying oil diluents, the resulting crosslinked TIPT films offer a distinct advantage over their non-crosslinked counterparts.

In contrast to oil-out TIPT films, the crosslinked oil-in TIPT films are much less expensive to produce as the oil does not require a removal step by an elaborate solvent wash bath with a solvent distillation and vapor recovery system. A crosslinked oil-in TIPT film will generally perform better than noncrosslinked oil-in TIPT film since the crosslinked oil, once immobilized, renders the microporous film less likely to foul adhesives, printing inks, and the like. Thus, the inventive film at least partially bridges the cost-performance gap between oil-in and oil-out TIPT films.

Microporosity may also be achieved by removing the crosslinked diluent through an oil removal step. This can be done using stretched or unstretched film after the desired level of crosslinking has occurred. If microporosity is not attained by stretching, then the film must contain some oil that can be removed during the wash step to obtain porosity. The removal of oil may be carried out by washing, extraction or other known methods. However, if the porosity is achieved by only oil removal and not in combination with stretching, then some degree (preferably at least 3%) of crosslinking of the oil must first take place to prevent removal of substantially all the oil and the phase transition is generally by phase separation and not gelation. If the transition is by gelation, the oil removal is generally done while the film is restrained.

The multi-layer microporous material or film of the present invention contains at least one layer of the above-described microporous material with at least one additional porous layer. By way of example, in a three-layer system the above-described porous layer is preferably the center layer sandwiched by, i.e., in between additional porous layers.

The multi-layer film may be formed by coextrusion followed by cooling to cause phase transition and then orientation and significant crosslinking of the oil component in at least one layer of the multi-layer film to form a porous film structure. The temperatures and other process conditions depend on the type of materials used and the properties desired from each layer, and are known or readily determined by those in the art. Alternatively, the microporous film may be prepared with a catalyst (accelerator) in at least one layer and washing out the uncrosslinked oil in all of the layers after some crosslinking has occurred in the layer containing catalyst. The coextrusion may employ a feedblock or a multi-manifold die at the extruder discharge. Cooling preferably is done by casting the multi-layer film onto a casting wheel or drum. In addition, the multi-layer film can be made by lamination means.

Once the uncrosslinked oil has been removed, the resultant microporous material may be imbibed with various fillers to provide any of a variety of specific functions, thereby providing unique articles. For example, the imbibing material or filler may be a liquid, solvent solution, solvent dispersion or solid. Such filler may be imbibed by any of a number of known methods which results in the deposition of such fillers within the porous structure of the microporous sheet. Some imbibing materials are physically placed within the microporous sheet. In some instances, the use of two or more reactive components as the imbibing materials permits a reaction within the microporous sheet structure. Examples of imbibing material include antistatic agents, surfactants, odorants and solid particulate material such as activated carbon, polymeric coatings and pigments. Certain materials such as antistatic agents or surfactants, may be imbibed without removal of the compound or compatible liquid used as a carrier for the filler.

The microporous articles or multi-layer films of the present invention may be employed in any of a wide variety of situations wherein microporous structures may be utilized. For example, the present crosslinkable oil technology has permitted the preparation of a microporous oil-in high density polyethylene film and, upon extraction of excess oil, has also complemented existing oil-out technologies. While high density polyethylene films have lower use temperatures, they are often preferred over polypropylene films since they yield better hand softness, and tear resistant characteristics. In contrast to oil-out films, crosslinkable oil-in microporous polyolefin films are economical to process on conventional film production equipment, as no solvent or solvent recovery processing is required. An extruder with either a blown film die or a cast film die and a casting wheel can be used to initiate the thermal phase separation process as described above. These resulting films can be washed and/or stretch oriented in either a uniaxial or biaxial manner to yield a microporous film. These microporous films are both porous and breathable as demonstrated by air-flow/Gurley values in the range of 25 to 500 sec/50 cc and moisture vapor transmission rates (MVTR's) in the range of 5,000 to 6,000 g/m$^2$/day. The films are thus suitable for many breathable garment and barrier film applications. In addition, crosslinked oil-in polyethylene films resist degradation by gamma radiation sterilization which is important in some medical applications.

It has also been found that upon sufficient oxidative crosslinking, the microporous oil-in polyolefin film of the present invention can be rendered hydrophllic or wettable with water. This can be monitored visually in the film by applying water which fills the pores, turning the originally opaque film translucent. A Fourier Transform Infrared Spectrometer can be used to spectroscopically detect oxidative by-products that are responsible for this wetting phenomena such as the formation of hydroxyl functional groups that yield a signal at approximately 3400 cm$^{-1}$. Hence, this film can be used in various aqueous-related applications, for example water filtration and purification systems, water-based graphic imaging and/or printing products, primers for adhesive and/or coatings, and the like.

The films of the present invention can also be prepared in a manner to make them repellent to water, acids, bases, oils, alkanes, alcohols and many other industrial solvents. The addition of a fluorocarbon additive blended in the oil appears to impart such properties; however, other low surface energy materials can also be grafted and/or coated onto the crosslinking oil to impart similar repellancy characteristics. Because the oil is crosslinked, it is less likely to be removed or leached out due to the migration of the oil into the coating. As in the case of oil-out films, solvent-based inks applied on crosslinked, oil-in microporous films show little or no tendency to bleed, leach and/or smear. Thus, crosslinkable, oil-in films are also suitable for solvent-based graphic/imaging applications.

In the following non-limiting examples, all parts and percentages are by weight unless otherwise indicated. In evaluating the materials of the invention and the comparative materials, the following test methods are used.

EXAMPLES

Test Methods

Gurley Air Flow

This value is a measurement of time in seconds required to pass 50 cc of air through a film according to ASTM D-726 Method B. A value of greater than 10,000 sec/50 cc is assigned if the Gurley timer does not start after 100 seconds from the start of the test.

Phase Separation Mechanism by Differential Scanning Calorimetry (DSC)

Microporous films containing crosslinkable oil are placed in a Perkin Elmer DSC 7 run at 10° C./minute to determine the melting point of these films. Generally, the melting point decreases as the concentration of oil increases if the film membrane is formed from a solid-liquid crystallization phase separation mechanism. The melting point is generally independent of oil concentration if the film membrane is formed by a liquid-liquid phase separation.

Phase Separation Mechanism by Scanning Electron Microscopy

Microporous film samples are washed with isopropyl alcohol for 20 minutes and air dried in a convection hood for at least 30 minutes to remove uncrosslinked oil from the sample before being placed in a Scanning Electron Micrograph (SEM) chamber and an SEM image is made at a predetermined magnification. Oil removal is essential to achieve satisfactory definition and to prevent SEM chamber contamination from vaporization of the uncrosslinked oil under vacuum. Morphology associated with solid-liquid crystallization phase separation membranes appears as spherical nodules or spherulites connected by fine tie fibrils and SEMs showing that structure are designated S/L. Morphology associated with liquid-liquid thermal phase separation membranes have a gel matrix structure and SEMs showing that structure are designated L/L.

EXAMPLES 1–4

Various microporous films were made to illustrate the effect of catalyst and heat treatment on the retention of oil, i.e., the degree of crosslinking of the crosslinkable oil component.

In Example 1, a polymer component (crystallizable polypropylene available under the trade designation of DS 5D45 from Shell Chemical Co.) with a melt flow index of 0.65 dg/min (ASTM D1238), Condition I), crystallinity of 48% and a melting point of 165° C. (measured by DSC) was fed into the hopper of a 25 mm twin-screw extruder. A crosslinkable oil component (linseed oil available under a trade designation Linseed Oil Supreme LSO from Cargill) having a viscosity of 25 centistokes (ASTM D445 at 35° C.) was introduced into the extruder through an injection port at a rate to provide a composition of 65% by weight of the polymer and 35% by weight crosslinkable oil. A blue colorant (phthalocyanine blue) was also included at a concentration of about 3.85 wt % based on the total of colorant and polypropylene. Blue is a color typically used for surgical gowns. The overall feed rate was 3.2 kg/hr. The polymer was heated to 271° C. in the extruder to melt and, after mixing with the oil, the temperature was maintained at 232° C. during the extrusion. The melt was extruded through a 30.5 cm-wide coat hanger slit die and cast as a 75 μm-thick transparent film onto a casting wheel maintained at 54° C. and having a patterned surface (comprising a multiplicity of small pyramid-shaped protrusions) that provided about 10% contact area with the cast film. Samples A, B, C and D of cast film were stretched 2×2 (ie., by a factor of 2 in both the machine direction and the transverse direction) times at 99° C., washed in VERTREL™423 (hydrochlorofluorocarbon-1,2,3 available from DuPont) for 5, 15, 30 and 60 minutes, respectively, and dried for 15 minutes at ambient temperature. The initially transparent films turned opaque upon orientation.

The microporous film of Example 2 was made essentially in the same manner as Example 1 except 0.02 parts by weight of crosslinking accelerator (a cobalt-based accelerator called Cobalt Code #72 available from OMG/Mooney Chemicals) per 100 parts by weight oil component was premixed with the oil component before the oil component was added into the extruder. Samples were exposed to different heat treatments as oriented or cast films before being washed for 15 minutes. Sample A was placed in an oven at 100° C. for 60 minutes as an oriented film. Sample B was not heat treated. Sample C was heat treated as Sample A but as a cast web.

Example 3 and 4 were made as in Example 2 except the catalyst levels were 0.06 parts and 0.10 parts respectively and the samples heated in an oven at 100° C. for 1 hour as cast films to accelerate crosslinking before washing.

Examples 1–4 were measured for weight before washing and after washing and the percent change was calculated. The values are reported in Table 1.

TABLE 1

| Example | Initial (g) | Final (g) | Change (%) |
|---|---|---|---|
| 1A | 0.2180 | 0.1570 | 28.0 |
| 1B | 0.2331 | 0.1553 | 33.4 |
| 1C | 0.1951 | 0.1296 | 33.6 |
| 1D | 0.2635 | 0.1753 | 33.5 |
| 2A | 0.3680 | 0.3516 | 4.5 |
| 2B | 0.4097 | 0.3252 | 20.6 |
| 2C | 1.1527 | 1.1106 | 3.7 |
| 3 | 1.2168 | 1.1992 | 1.4 |
| 4 | 1.2140 | 1.2042 | 0.8 |

As seen in the above table, a significant amount of crosslinkable oil is crosslinked when a catalyst is present but a much larger percentage of crosslinkable oil is crosslinked if a subsequent heat treatment is also used.

EXAMPLE 5

A Microporous film was made in a manner similar to that of Example 2 except the catalyst amount used was 0.07 parts and samples were allowed to set for different lengths of time before orientation. Sample A was stretched after 3 hours and turned opaque white (i.e., became microporous). Sample B was stretched after 48 hours and remained transparent (i.e., did not become microporous only by orientation).

EXAMPLE 6–11

Microporous films were made with various ratios of polymer component to crosslinkable oil component.

Examples 6–11 were made similar to Example 1 except: the casting wheel temperature was changed from 54° C. to 65° C.; weight ratios of polymer component to crosslinkable oil component were 70:30, 60:40, 50:50, 40:60, 30:70, and 20:80, respectively; and a nucleating agent (dibenzylidine sorbitol available as Millad 3905 from Milliken Chemical Co., Inman, S.C.) was added in the following amounts (expressed as weight percent of polymer): 0.07, 0.13, 0.19, 0.25, 0.30 and 0.30 for Examples 6–11, respectively. The melting points of the compositions were measured by DSC and compared with the melting point of the polymer used in the compositions. Also each Example was washed and examined by SEM for morphology. The results are shown in Table 2.

TABLE 2

| Example | Melting Point (° C.) | Morphology |
|---|---|---|
| polypropylene | 166 | — |
| 6 | 162 | S/L |
| 7 | 162 | S/L |
| 8 | 160 | S/L |
| 9 | 157 | S/L |
| 10 | 157 | S/L |
| 11 | 158 | S/L |

As seen from the above table, both the melting point vs. oil concentration and the SEMs suggest that the mechanism is one of a solid-liquid crystallization phase separation.

EXAMPLES 12–13

Microporous files and 12 and 13 were made in a manner similar to Example 9 except no nucleating agent addictive was used, and in Example 13, the casting wheel temprature was raised to 90° C. Data for Examples 9, 12 and 13 are given in Table 3 below:

TABLE 3

| Example | Nucleating Agent | Casting Wheel Temperature (° C.) | Gurley (sec/50 cc) |
|---|---|---|---|
| 9 | Millad 3905 | 65 | 2800 |
| 12 | None | 65 | 4000 |
| 13 | None | 90 | 2500 |

From this data, one can tell that a nucleating agent is not required in order to obtain porosity, and increasing casting wheel temperature improves porosity. Eliminating the nucleating agent has the advantage that there is less tendency to produce a sludge (comprised in part of nucleating agent, polymer and oil gel) in the washing or extraction step. It was somewhat surprising that polypropylene microporous membranes could be successfully made without nucleating agent.

EXAMPLES 14–17 AND COMPARATIVE EXAMPLE 1

The inventive microporous films can be made from some polymer components not easily used in known processes.

Example 14 was made in a manner similar to Example 1 except the polymer component was high density polyethylene (HDPE 1285 melting point 131° C. available from FINA) and the weight ratio of the polymer component to crosslinkable oil component was 40:60. The cast film was transparent before orientation.

The microporous films of Examples 15 and 16 were made essentially in the same manner as Example 14 except a crosslinking accelerator (Cobalt Code #72 from OMG Mooney Chemicals, Inc., Cleveland, Ohio) was premixed with the oil component before the oil component was added into the extruder at 0.15 parts and 0.075 parts per 100 parts oil component, respectively. The cast films were transparent before orientation.

Example 17 was made in a manner similar to Example 16 except a low energy polymer additive, fluorocarbon oxazolidinone (available as a powder from Minnesota Mining and Manufacturing Company), was also premixed with the oil component at 1.5 parts per 100 parts oil component before the oil component was added into the extruder. The cast film was transparent before orientation.

Comparative Example 1 was made as in Example 14 except an uncrosslinkable oil (Mineral Oil Superla White #31 available from Amoco Chemical Co.) was used. The cast film was transparent before orientation.

The visual appearance of the films after orientation was observed and Gurley air flow measurements were taken. The results are reported below in Table 4.

TABLE 4

| Example | Appearance | Gurley (sec/50 cc) |
|---|---|---|
| 14 | opaque | 222 |
| 15 | opaque | 170 |
| 16 | opaque | 257 |
| 17 | opaque | 223 |
| CE1 | transparent | >10,000 |

All of the inventive examples were gas permeable; while the comparative example was not. Example 17 also exhibited high fluid hold-out repellency.

EXAMPLE 18 COMPARATIVE EXAMPLE 1

In Example 18, microporous films made as in Example 15, but with various film thicknesses, were subjected to subsequent heat exposures and washed for 30 minutes with isopropyl alcohol to remove uncrosslinked oil and were compared with Comparative Example 1 thatwas subjected to the same washing.

weight were measured after orientation but before any post heat treatment and after washing, and the change in weight was reported. The films were also measured for film thickness, Gurley air flow and bubble point pore size. The results are reported in Table 5.

TABLE 5

| Example | Heat Treatment (° C., minutes) | Thickness (μm) | Weight Change (%) | Gurley (sec/50 cc) | Bubble Pt (μm) |
|---|---|---|---|---|---|
| 18A | none | 43 | 31 | 125 | 0.8 |
| 18B | 100,60 | 38 | 22 | 175 | 0.7 |
| 18C | 110,60 | 41 | 20 | 121 | 0.7 |
| 18D | 120,60 | 25 | 16 | 1739 | 0.4 |
| CE1 | none | 64 | 60 | 34 | 0.6 |

As seen in the above table, when the temperature of the heat treatment approaches the melting point of the polymer component, the microporous cells tend to partially collapse as seen by the increase in Gurley value for Example 18D. Bubble point is a measure of the size (diameter) of the largest air bubbles passing through the films (using ASTM test No. F316-86 at 50 cc of air). Larger bubble point indicates larger pore size.

EXAMPLES 19–24

The color and odor of the microporous films can be affected by additional additives.

Example 19 was made as in Example 14 except the film thickness was about 150 μm and the film was oriented 2×2.

Examples 20–23 were made in a manner similar to that of Example 19 except different odorants in the amount of 2 parts of odorant per 100 parts oil component were premixed into the oil component before the oil component was added into the extruder. In Example 20–23, the odorants were peppermint oil (available as Peppermint 65400), lemon oil (available as Lemon 830172), orange oil (available as Orange 830174) and spearmint oil (available as Spearmint 75520), respectively (all available from Givaudan-Roure, Clifton, N.J.).

Example 24 was made in a manner similar to that of Example 20 except 0.5 parts of lemon oil, 3 parts of fluorocarbon oxazolidinone and 5 parts of titanium dioxide (available as TiPure™R706-W1 from DuPont), all per 100 parts oil component, were added instead of peppermint oil.

The microporous films of Examples 19–24 were subjectively evaluated for appearance and odor and were measured for film thickness, Gurley air flow and bubble point pore size. The results are reported in Table 6.

TABLE 6

| Example | Thickness (μm) | Gurley (sec/50 cc) | Appearance | Odor | Bubble Pt (μm) |
|---------|----------------|--------------------|------------|------|----------------|
| 19 | 150 | 117 | yellow tint | mild | 0.3 |
| 20 | 150 | 177 | yellow tint | pleasing | 0.3 |
| 21 | 100 | 185 | yellow tint | pleasing | 0.2 |
| 22 | 100 | 140 | yellow tint | pleasing | 0.3 |
| 23 | 150 | 150 | yellow tint | pleasing | 0.3 |
| 24 | 100 | 65 | white | pleasing | 0.6 |

Microporous films can contain additives to affect such properties as odor and color. As shown by the bubble point data, pore size is also affected.

EXAMPLES 25–30

Microporous films were made with various ratios of a high density polyethylene (HDPE) polymer component to crosslinkable oil component.

Examples 25–30 were made as Example 14 except the weight ratios of polymer component to crosslinkable oil component were 70:30, 60:40, 50:50, 40:60, 30:70 and 20:80, respectively. The melting points of the compositions were measured by DSC and compared with the melting point of the polymer used in the compositions. Also each example was washed and examined by SEM for morphology. The results are shown in Table 7.

TABLE 7

| Example | Melting Point (° C.) | Morphology |
|---------|----------------------|------------|
| HDPE | 131 | — |
| 25 | 126 | S/L |
| 26 | 128 | S/L |
| 27 | 126 | S/L |
| 28 | 127 | S/L |
| 29 | 126 | S/L |
| 30 | 128 | S/L |

As seen from the above table, the melting point vs. oil concentration data suggests that the mechanism is one of a liquid-liquid phase separation, but the SEMs suggest that the mechanism is one of a solid-liquid crystallization phase separation.

EXAMPLE 31

Microporous films can be made that are resistant to gamma sterzization.

In Example 31, a microporous film similar to Example 18B, and Comparative Example 3 were placed in a Panoramic Co$^{60}$ gamma Industrial Irradiator (Model JF7500) and exposed to gamma radiation at a dose of 3.0–3.1 megaRads for 240 minutes. The films were then tested for elongation in an Instron testing apparatus over a period of 3 months to observe any degradation or embrittlement as determined by a decrease in elongation. The results are in Table 8.

TABLE 8

| Time | Percent Elongation at Break | |
|------|------------|------|
| (months) | Example 31 | CE 1 |
| 0 | 400 | 370 |
| 0.25 | 400 | 170 |
| 1 | 350 | 140 |
| 3 | 340 | 120 |

As seen in the table, the HDPE—crosslinked oil microporous film of the invention retained good mechanical properties even after many weeks of aging after sterilization by gamma radiation. In contrast, the traditional polypropylene uncrosslinkable oil-in microporous film of Comparative Example 1 (CE 1) had substantial degradation of mechanical properties after only one week aging.

In general, an open pore structure is desired. Approximately 60 wt % oil yields such as a pore structure while leaving the mircoporous material with sufficient strength for practical utility.

EXAMPLE 32

Microporous laminates can be made that have a soft cloth-like hand and controlled porosity.

A microporous film similar to Example 31 was placed between 2 layers of POLYBOND™T-86205 spunbond polyethylene non-woven web backing (basis weight 25 g/m$^2$, available from Dow Chemical Co.) as the three webs entered a heated nip. The nip was formed by a top roll having a metal surface with a square diamond pattern embossed on the roll and a bottom roll having a resilient Hypalon rubber surface. The pattern on the metal roll (obtained as pattern no. 28IR03 from Inta-Roto, Inc. of Richmond, Va.) comprised a regular array of small frusta of square pyramids (about 145 per square inch, 22.5 per square cm, of surface and about 0.89 mm high). The roll obtained from Inta-Roto was ground down (by a depth of about 25 μm) to increase the land or flat area for bonding. The bond area (i.e., percent of the non-woven web surface bonded to the microporous film) was approximately 15% of the total area. The metal-surfaced roll was heated to 113° C. and both rolls exerted a pressure of 689 KPa (100 psi) on the three webs as they passed through the nip. The webs were conveyed at a speed of 3 meters per minute (10 fpm) and the resulting laminate had a total thickness of 480 μm.

The microporous middle film was observed to adhere to the two outer non-woven layers, while allowing the microporous film to retain useful porosity. The Gurley Air Flow for the multilayer construction was measured at 70 sec/50 cc.

EXAMPLE 33

A microporous film was made in a manner similar to Example 14 except the film thickness after stretching was 79 μm and Gurley Air Flow was 160.

The film was divided into an "A" portion and a "B" portion. The A portion was immersed in isopropyl alcohol to extract the uncured oil component. The B portion was hung from a wall and exposed to ambient air for 1 week. Then the B portion was immersed in isopropyl alcohol to extract the uncured oil component. The weights of the sample before and after washing and the % change in weight are reported below.

TABLE 9

| Example | Initial (g) | Final (g) | Change (%) |
|---------|-------------|-----------|------------|
| 33A     | 0.2216      | 0.0966    | 56         |
| 33B     | 0.2514      | 0.2380    | 5          |

As seen in the above table, little of the crosslinkable oil had crosslinked before aging as shown by Example 33A. However, substantially all of the crosslinkable oil had crosslinked after 1 week exposure to the oxygen in the atmosphere (as shown by Example 33B).

The above specification, examples and data provide a complete description of the manufacture and use of the composition of the invention. Since many embodiments of the invention can be made without departing from the spirit and scope of the invention, the invention resides in the claims hereinafter appended.

We claim:

1. A microporous material comprising:
   (a) about 10 to 97 parts by weight of a polymer component; and
   (b) about 3 to 90 parts by weight of an oil component, having at least one crosslinkable oil, said oil component being miscible with the polymer component at a temperature above the melting point of the polymer component, liquid-liquid phase separation temperature of the total composition or gel formation temperature of the total composition and wherein at least a portion of the crosslinkable oil is crosslinked.

2. The material of claim 1, wherein the polymer component is a polyolefin, a polyolefin blend or a mixture thereof.

3. The material of claim 2, wherein the polyolefin is polypropylene or high density polyethylene.

4. The material of claim 1, wherein the crosslinkable oil is linseed oil, sunflower oil, safflower oil, or a mixture thereof.

5. The material of claim 1, wherein the oil component comprises up to 50 weight percent of an uncrosslinkable oil.

6. The material of claim 1, which further comprises about 0.001 to 2.0 weight percent of an accelerator based on the weight of the total crosslinkable oil.

7. The material of claim 6, wherein the crosslinking accelerator is a metal drier.

8. A multi-layer microporous film comprising at least one layer of a microporous material according to claim 1.

9. A method of making a microporous article, comprising:
   (a) melt blending to form a solution comprising about 20 to 80 parts by weight of a polymer component, and about 20 to 80 parts by weight, based on a total solution content, of an oil component, having at least one crosslinkable oil, said oil component being miscible with the polymer component at a temperature above the melting temperature of the polymer component or the liquid-liquid phase separation temperature of the total solution;
   (b) forming a shaped article of the melt blended solution;
   (c) cooling said shaped article to a temperature at which phase transition occurs between the oil component and the polymer component through either (i) crystallization precipitation of the polymer component to form a network of polymer domains, or (ii) liquid-liquid phase separation to form cells of a polymer-lean phase;
   (d) creating porosity by orienting said article at least in one direction to separate adjacent crystallized polymer domains or polymer-lean cells from one another to provide a network of interconnected micropores therebetween; and
   (e) crosslinking the crosslinkable oil.

10. The method of claim 9, wherein crosslinking of the oil is enhanced with heat or radiation.

11. The method of claim 9, wherein the polymer component is polypropylene or high density polyethylene.

12. The method of claim 9, wherein the crosslinkable oil is linseed oil.

13. The method of claim 9, wherein the melt blend further comprises from about 0.001 to about 2% of a crosslinking accelerator based on the weight of the total crosslinkable oil.

14. A method of making a microporous article, comprising:
   (a) melt blending to form a solution comprising about 2 to 80 parts by weight of a polymer component, about 20 to 98 parts by weight, based on a total solution content, of an oil component, having at least one crosslinkable oil, said oil component being miscible with the polymer component at a temperature above the melting temperature of the polymer component, or the liquid-liquid phase separation temperature of the total solution or the gel transition temperature of the total solution;
   (b) forming a shaped article of the melt blended solution;
   (c) cooling said shaped article to a temperature at which phase transition occurs between the oil component and the polymer component through either (i) crystallization precipitation of the polymer component to form a network of polymer domains, (ii) liquid-liquid phase separation to form cells of a polymer-lean phase, or (iii) gelation;
   (d) partially crosslinking the oil component to at least about 3% by weight based on total weight of the oil component, and
   (e) creating porosity by (i) removing uncrosslinked oil, (ii) removing uncrosslinked oil and orienting said article at least in one direction, or (iii) removing uncrosslinked oil while restraining said article at least in one direction.

15. The method of claims 14, wherein the oil component comprises up to 50 percent of an uncrosslinkable oil.

16. The method of claim 14, wherein crosslinking of the oil component is enhanced with heat, radiation or the presence of about 0.001 to 2.0%, based on the weight of total crosslinkable oil, of a crosslinking accelerator in the solution.

17. The method of claim 16, wherein the crosslinking accelerator is a metal drier.

18. The method of claim 17 in which the metal drier is selected from the group consisting of cobalt, manganese, cerium, vanadium, iron, lead, zirconium, aluminum, bismuth and rare earth metals.

19. The method of claim 16 in which the crosslinking accelerator is selected from the group consisting of organic peroxides, azobisisobutyronitrile and photoinitiators.

20. A method for laminating a microporous polymer film to a web selected from the group consisting of non-woven fabric, woven fabric, porous film, and non-porous film, said method comprising pressing the microporous film and the web together in a nip between a rubber roll and a metal roll having an embossing pattern on its surface and heated sufficiently to soften the material facing the metal roll.

21. A microporous material comprising:
   (a) about 2 to 97 parts by weight of a polymer component;
   (b) about 3 to 98 parts by weight of an oil component, comprising at least one crosslinkable oil, said oil component being miscible with the polymer component at a temperature above the melting point of the polymer component, liquid-liquid phase separation temperature of the total composition or gel formation temperature of the total composition and wherein at least a portion of the crosslinkable oil is crosslinked; and
   (c) about 0.001 to 2.0%, based on the weight of the total crosslinkable oil, of an accelerator.

* * * * *

UNITED STATES PATENT AND TRADEMARK OFFICE
CERTIFICATE OF CORRECTION

PATENT NO.: 6,010,776      Page 1 of 2

DATED: January 4, 2000

INVENTOR(S): Bert J. Exsted, Robert J. Maki, Jeffrey M. Mailand, Scott R. Kaytor, Claudia L. Allison, Sean B. Mahoney It is certified that error appears in the above-identified patent and that said Letters Patent is hereby corrected as shown below:

Column 1, line 7, "mbranes" should read --membranes--.

Column 1, line 8, "ermoplastic" should read --thermoplastic--.

Column 1, line 12, "o" should read --to--.

Column 1, line 13, "ath" should read --path--.

Column 2, line 24, "crosslinling" should read --crosslinking--.

Column 2, line 32, "imicroporous" should read --microporous--.

Column 4, line 6, "eversible" should read --reversible--.

Column 6, line 41, "Crosslinling" should read --Crosslinking--.

Column 7, line 1, "crosslirkable" should read --crosslinkable--.

Column 7, line 12, "crosslirked" should read --crosslinked--.

Column 8, line 17, "terminateldimerize" should read --terminate/dimerize--.

Column 13, line 23, "files" should read --films--.

Signed and Sealed this

Fifteenth Day of May, 2001

*Attest:*

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO. : 6,010,776
DATED : January 4, 2000
INVENTOR(S) : Bert J. Exsted, Robert J. Maki, Jeffrey M. Mailand, Scott R. Kaytor, Claudia L. Allison, Sean B. Mahoney It is certified that error appears in the above-identified patent and that said Letters Patent is hereby corrected as shown below:

Column 13, line 24, "addictive" should read --additive--.

Column 14, line 33, "thatwas" should read --that was--.

Column 14, line 35, "weight" should read --Weights--.

Column 16, Table 8, "140" should read --110--.

Signed and Sealed this

Fifteenth Day of May, 2001

Attest:

NICHOLAS P. GODICI

Attesting Officer     Acting Director of the United States Patent and Trademark Office